(12) United States Patent
Yang (10) Patent No.: US 10,849,103 B2
(45) Date of Patent: Nov. 24, 2020

(54) DATA TRANSMISSION METHOD, NETWORK DEVICE, AND TERMINAL DEVICE

(71) Applicant: Guangdong OPPO Mobile Telecommunications Corp., Ltd., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/338,584

(22) PCT Filed: Sep. 15, 2017

(86) PCT No.: PCT/CN2017/101950
§ 371 (c)(1),
(2) Date: Apr. 1, 2019

(87) PCT Pub. No.: WO2019/051802
PCT Pub. Date: Mar. 21, 2019

(65) Prior Publication Data
US 2020/0045672 A1 Feb. 6, 2020

(51) Int. Cl.
*H04W 4/00* (2018.01)
*H04W 72/00* (2009.01)
(Continued)

(52) U.S. Cl.
CPC ......... *H04W 72/005* (2013.01); *H04L 5/0091* (2013.01); *H04W 72/042* (2013.01); *H04W 72/0446* (2013.01); *H04W 72/1273* (2013.01)

(58) Field of Classification Search
CPC ............. H04W 72/005; H04W 72/042; H04W 72/1273; H04W 72/0446; H04L 5/0091
(Continued)

(56) References Cited

U.S. PATENT DOCUMENTS

2014/0050191 A1* 2/2014 Kim ...................... H04L 5/0053
370/329
2014/0050192 A1* 2/2014 Kim ....................... H04L 5/001
370/329
(Continued)

FOREIGN PATENT DOCUMENTS

CN 102076088 A 5/2011
CN 102958133 A 3/2013
(Continued)

OTHER PUBLICATIONS

Extended European search report issued in corresponding European application No. 17923986.8 dated Sep. 23, 2019.
(Continued)

*Primary Examiner* — Thai D Hoang (57) ABSTRACT

A data transmission method includes: sending a terminal device first indication information, which is carried in at least one first information block of a plurality of first information blocks sent by the network device sends on a PBCH during a first period, the first indication information is used for indicating a resource position of first scheduling information on a PDCCH, the first scheduling information is used for indicating a resource position of a second information block on a PDSCH, and the first period is a period during which the network device sends the second information block to the terminal device on the PDSCH; sending the first scheduling information to the terminal device on the PDCCH according to the first indication information during the first period; and sending the second information block to the terminal device on the PDSCH according to the first scheduling information during the first period.

8 Claims, 5 Drawing Sheets

(51) Int. Cl.
*H04L 5/00* (2006.01)
*H04W 72/04* (2009.01)
*H04W 72/12* (2009.01)

(58) Field of Classification Search
USPC .............. 370/329–330, 335–345, 347–348, 370/436–437
See application file for complete search history.

(56) References Cited

U.S. PATENT DOCUMENTS

| | | | | |
|---|---|---|---|---|
| 2014/0086173 | A1* | 3/2014 | Sadeghi | H04L 5/003 370/329 |
| 2014/0204853 | A1* | 7/2014 | Ko | H04L 5/0035 370/329 |
| 2014/0219202 | A1* | 8/2014 | Kim | H04W 72/0413 370/329 |
| 2014/0301336 | A1* | 10/2014 | Kim | H04L 27/2608 370/329 |
| 2015/0257173 | A1* | 9/2015 | You | H04B 17/318 370/330 |
| 2015/0359036 | A1* | 12/2015 | Seo | H04W 72/1294 370/329 |
| 2015/0373668 | A1* | 12/2015 | Lee | H04L 5/0092 370/329 |
| 2016/0127097 | A1* | 5/2016 | Chen | H04L 5/0051 370/330 |
| 2017/0230951 | A1* | 8/2017 | Xiong | H04W 72/042 |

FOREIGN PATENT DOCUMENTS

| | | |
|---|---|---|
| CN | 103857041 A | 6/2014 |
| WO | 2013000440 A1 | 1/2013 |

OTHER PUBLICATIONS

3GPP TSG-RAN WG2 NR Adhoc#2 Meeting; R2-1706762 Qingdao, China, Jun. 27-29, 2017.
3GPP TSG-RAN WG2 NR Adhoc#2 Meeting; R2-1706767 Qingdao, China, Jun. 27-29, 2017.
3GPP TSG-RAN2#99; R2-1707767 Berlin, Germany, Aug. 21-25, 2017.
3GPP TSG RAN WG1 Meeting NR#3; R1-1715378 Nagoya, Japan, Sep. 18-21, 2017.
3GPP TSG RAN WG1 Meeting NR Ad-hoc #3; R1-1716278 Nagoya, Japan, Sep. 18-21, 2017.
3GPP TR 38.912 v14.1.0, "Technical Specification Group Radio Access Network; Study on New Radio access technology", 3rd Generation Partnership Project, Release 14 XP051336695, Jun. 2017.
3GPP TR 38.802 v14.2.0, "Technical Specification Group Radio Access Network; Study on New Radio access technology", 3rd Generation Partnership Project, Release 14 XP051351407, Sep. 2017.

* cited by examiner

DATA TRANSMISSION METHOD, NETWORK DEVICE, AND TERMINAL DEVICE

CROSS-REFERENCE TO RELATED APPLICATION(S)

This application is a 371 application of International Application No. PCT/CN2017/101950, filed on Sep. 15, 2017, the entire disclosure of which is hereby incorporated by reference.

TECHNICAL FIELD

Implementations of the present disclosure relate to the communication field, and more particularly, to a data transmission method, a network device and a terminal device.

BACKGROUND

In an existing Long Term Evolution (LTE) system, a broadcast mechanism is used for system information. Specifically, after user equipment (UE) acquires a downlink synchronization signal from a Primary Synchronization Signal (PSS) and a Secondary Synchronization Signal (SSS), the UE monitors Master Information Block (MIB) and System Information Block Type 1 (SIB1) information on specific time-frequency resources, and then acquires first scheduling information of another SIB from the SIB1. In other words, main system information (MSI) and other system information (other SI) are not distinguished in system information of the LTE, and a unified and fixed scheduling mode is adopted.

However, this mechanism cannot support broadcasting system information flexibly according to needs. The UE needs to acquire unnecessary system information, which occupies too much downlink broadcast resources.

In addition, a 5th Generation (5G) New Radio (NR) system also urgently needs a mechanism for broadcasting system information according to needs to be proposed.

SUMMARY

A data transmission method, a network device and a terminal device are provided.

In a first aspect, a data transmission method, includes: a network device sends a first indication information to a terminal device, and the first indication information is carried in at least one first information block, a plurality of first information blocks sent by the network device to the terminal device on a physical broadcast channel (PBCH) during a first period, include the at least one first information block, the first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH. The network device sends the first scheduling information to the terminal device on the PDCCH according to the first indication information during the first period.

The network device sends the second information block to the terminal device on the PDSCH according to the first scheduling information during the first period.

In the implementation of the present disclosure, the network device can effectively save broadcast resources by broadcasting system information according to the needs.

In some possible implementations, sending, by the network device, the first indication information to the terminal device includes: the network device sends the plurality of first information blocks to the terminal device on the PBCH during the first period, and each first information block of the plurality of first information blocks includes the same first indication information.

In some possible implementations, before the network device sends the first indication information to the terminal device, the method further includes: the network device determines a first system frame number during the first period. And sending, by the network device, the first indication information to the terminal device includes: the network device sends the plurality of first information blocks to the terminal device on the PBCH during the first period, and a first information block, of the plurality of first information blocks, corresponding to the first system frame number includes the first indication information.

In some possible implementations, the first period is a multiple of a second period, and the second period is a period during which the network device sends the plurality of first information blocks to the terminal device on the PBCH. Determining, by the network device, the first system frame number during the first period, includes: determining the first system frame number according to following criteria: a remainder of the first system frame number divided by a first value is equal to a first threshold, the first value is a quotient of the first period divided by the second period, and the first threshold is used for the network device to determine the first system frame number within the first period.

In some possible implementations, the second information block includes second scheduling information, the second scheduling information is used for indicating a resource position of a third information block on a PDSCH, and the second information block and the third information block are different information blocks.

In some possible implementations, before the network device sends the first indication information to the terminal device, the method further includes: the network device determines a first system frame number and a second system frame number during the first period, and the first system frame number and the second system frame number are different system frame numbers. The network device sends second indication information to the terminal device according to the first system frame number and the second system frame number, and the first indication information is carried in a first information block, of the plurality of first information blocks, corresponding to the first system frame number in, the second indication information is carried in a first information block, of the plurality of first information blocks, corresponding to the second system frame number, the second indication information is used for indicating a resource position of the second scheduling information on the PDCCH, the second scheduling information is used for indicating a resource position of a third information block on a PDSCH, and the third information block and the second information block are different information blocks.

In some possible implementations, the first period is a multiple of a second period, and the second period is a period during which the network device sends the plurality of first information blocks to the terminal device on the PBCH. Determining, by the network device, the first system frame number and second system frame number during the first period, includes: determining the first system frame number and the second system frame number according to following criteria: a remainder of the first system frame number divided by a second value is equal to a second threshold, the second threshold is used for the network device to determine the first system frame number during the first period; a remainder of the second system frame number divided by a second value is equal to a third threshold, the third threshold is used for the network device to determine the second system frame number during the first period, and the second threshold and the third threshold are not equal.

In some possible implementations, the first threshold is equal to 0, and the second threshold is equal to 1.

In a second aspect, a data transmission method is provided, the method includes: a terminal device receives first indication information sent by a network device, and the first indication information is carried in at least one first information block, a plurality of first information blocks sent by the network device sends to the terminal device on a physical broadcast channel (PBCH) during a first period, include the at least one first information block, the first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH. The terminal device receives the first scheduling information sent by the network device on the PDCCH according to the first indication information during the first period. The terminal device receives the second information block sent by the network device on the PDSCH according to the first scheduling information during the first period.

In some possible implementations, receiving, by the terminal device, the first indication information sent by the network device includes: the terminal device receives the plurality of first information blocks sent by the network device on the PBCH during the first period, and each first information block of the plurality of first information blocks includes the same first indication information.

In some possible implementations, before the terminal device receives the first indication information sent by the network device, the method further includes: the terminal device determines a first system frame number during the first period; and receiving, by the terminal device, the first indication information sent by the network device includes: the terminal device receives the plurality of first information blocks sent by the network device on the PBCH during the first period, and a first information block, of the plurality of first information blocks, corresponding to the first system frame number includes the first indication information.

In some possible implementations, the first period is a multiple of a second period, the second period is a period during which the network device sends the plurality of first information blocks to the terminal device on the PBCH; and determining, by the terminal device, the first system frame number during the first period, includes: determining the first system frame number according to following criteria: a remainder of the first system frame number divided by a first value is equal to a first threshold, the first value is a quotient of the first period divided by the second period, and the first threshold is used for the terminal device to determine the first system frame number within the first period.

In some possible implementations, the second information block includes second scheduling information, the second scheduling information is used for indicating a resource position of a third information block on a PDSCH, and the second information block and the third information block are different information blocks.

In some possible implementations, before the terminal device receives the first indication information sent by the network device, the method further includes: the terminal device determines a first system frame number and a second system frame number during the first period, and the first system frame number and the second system frame number are different system frame numbers.

Receiving, by the terminal device, the first indication information sent by the network device includes: the terminal device receives second indication information sent by the network device according to the first system frame number and the second system frame number, and the first indication information is carried in a first information block, of the plurality first information blocks, corresponding to the first system frame number, the second indication information is carried in a first information block, of the plurality of first information blocks, corresponding to the second system frame number, the second indication information is used for indicating a resource position of the second scheduling information on the PDCCH, the second scheduling information is used for indicating a resource position of the third information block on the PDSCH, and the third information block and the second information block are different information blocks.

In some possible implementations, the first period is a multiple of a second period, the second period is a period during which the network device sends the plurality of first information blocks to the terminal device on the PBCH. Determining, by the terminal device, the first system frame number and the second system frame number during the first period, includes: determining the first system frame number and the second system frame number according to following criteria: a remainder of the first system frame number divided by a second value is equal to a second threshold, the second threshold is used for the terminal device to determine the first system frame number during the first period; a remainder of the second system frame number divided by a second value is equal to a third threshold, the third threshold is used for the terminal device to determine the second system frame number during the first period, and the second threshold and the third threshold are not equal.

In some possible implementations, the first threshold is equal to 0, and the second threshold is equal to 1.

In a third aspect, a network device is provided, and the network device includes a transceiver unit. The transceiver unit is used for performing various processes performed by a base station in the method for downlink transmission in the first aspect and various implementations.

In a fourth aspect, a network device is provided, and the network device includes a transceiver. The transceiver is used for performing various processes performed by a base station in the method for downlink transmission in the first aspect and various implementations.

In a fifth aspect, a terminal device is provided, and the terminal device includes a transceiver unit. The transceiver unit is used for performing various processes executed by a terminal device in the method for downlink transmission in the second aspect and various implementations.

In a sixth aspect, a terminal device is provided, and the terminal device includes a transceiver. The transceiver is used for performing various processes executed by a terminal device in the method for downlink transmission in the second aspect and various implementations.

In a seventh aspect, a computer readable medium is provided for storing a computer program. The computer program includes instructions used for executing the method implementations of the above first aspect or the second aspect.

In an eighth aspect, a computer chip is provided, including an input interface, an output interface, at least one processor, and a memory. The processor is used for executing codes in the memory. When the codes are executed, the processor may implement various processes performed by the network device in the data transmission method in the first aspect and various implementations.

In a ninth aspect, a computer chip is provided, including an input interface, an output interface, at least one processor, and a memory. The processor is used for executing codes in the memory. When the codes are executed, the processor may implement various processes executed by the terminal device in the data transmission method in the second aspect and various implementations.

In a tenth aspect, a communication system is provided, including the above network device and the above terminal device.

DETAILED DESCRIPTION

Figure 1:
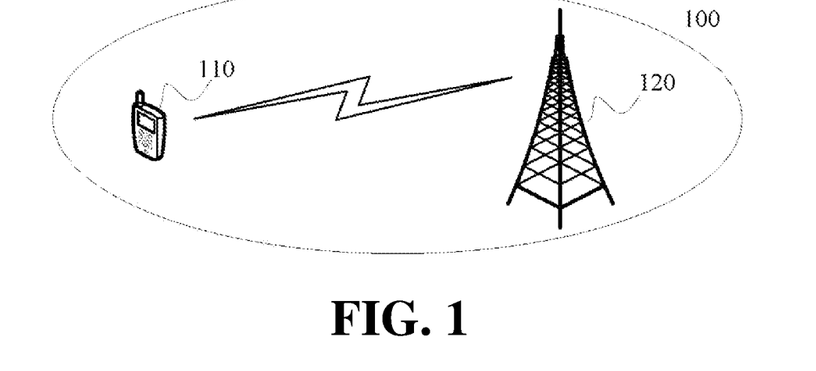
FIG. 1 is an example of an application scenario of the present disclosure.

FIG. 1 is a schematic diagram of an application scenario according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the communication system 100 is only an example for describing the implementation of the present disclosure. However, implementations of the present disclosure are not limited to this. In other words, the technical solutions in the implementations of the present disclosure may be applied in various communication systems, for example, a Long Term Evolution (LTE) system, an LTE Time Division Duplex (TDD) system, a Universal Mobile Telecommunication System (UMTS). For ease of description, a 5th Generation (5G) New Radio (NR) communication system is used as an example for describing the following implementations of the present disclosure.

The present disclosure describes various implementations in connection with a network device and a terminal device.

The network device 120 may refer to any entity on a network side for sending or receiving signals. For example, it may be a user equipment of machine type communication (MTC), an Evolutional Node B (eNB or eNodeB) in LTE, a base station device in a 5G network, or the like.

In addition, the terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, an on-board device, a wearable device, a terminal device in a 5G network or the like.

In an existing LTE system, a broadcast mechanism is used for system information. Specifically, after a terminal device acquires a downlink synchronization signal from a Primary Synchronization Signal (PSS) and a Secondary Synchronization Signal (SSS), the terminal monitors MIB and SIB1 information on specific time-frequency resources, and then acquires scheduling information of another SIB from SIB1. That is, a unified and fixed scheduling mode is adopted for the system information of the LTE. In other words, the network device cannot support flexibly broadcasting system information. The terminal device may need to acquire unnecessary system information, which occupies too much downlink broadcast resources, and reduces user experience.

Therefore, an implementation of the present disclosure provides a method for scheduling and indicating system information in a communication system, which allows to perform scheduling and transmission on an MIB, SIB1, and SIB2 in different periods.

Figure 2:
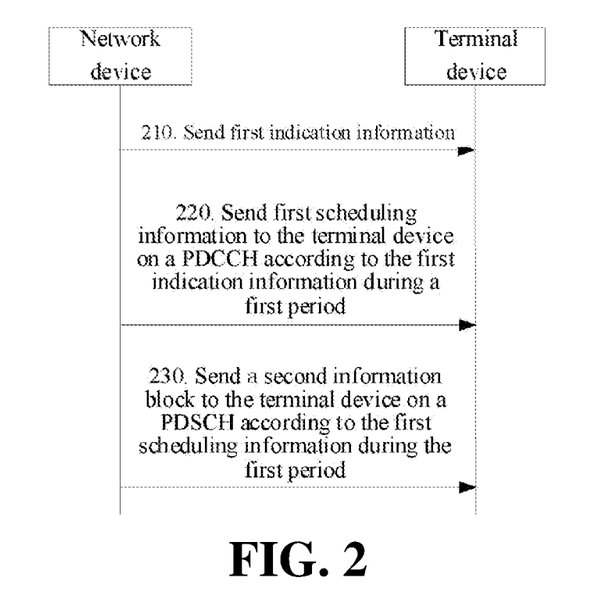
FIG. 2 is a schematic flowchart of a data transmission method according to an implementation of the present disclosure.

FIG. 2 is a schematic flowchart of a data transmission method according to an implementation of the present disclosure.

As shown in FIG. 2, the method includes following acts 210, 220, 230.

In 210, a network device sends first indication information to a terminal device.

In 220, the network device sends first scheduling information to the terminal device on a Physical Downlink Control Channel (PDCCH) according to the first indication information during a first period.

In 230, the network device sends a second information block to the terminal device on a PDSCH according to the first scheduling information during the first period.

Specifically, the network device sends the first indication information to the terminal device. The first indication information is carried in at least one first information block, a plurality of first information blocks sent by the network device to the terminal device on the physical broadcast channel (PBCH) during a first period, include the above at least one first information block. The first indication information is used for indicating a resource position of the first scheduling information on the physical downlink control channel (PDCCH), the first scheduling information is used for indicating a resource position of the second information block on the physical downlink shared channel (PDSCH), and the first period is a period during which the network device sends the second information block to the terminal device on the PDSCH. The network device sends the first scheduling information to the terminal device on the PDCCH according to the first indication information during the first period. The network device sends the second information block to the terminal device on the PDSCH according to the first scheduling information during the first period.

In other words, the network device sends the plurality of first information blocks to the terminal device, at least one first information block of the plurality of first information blocks includes the first indication information of the first scheduling information located on the PDCCH. The first indication information indicates a resource position of the first scheduling information on the PDCCH, and the first scheduling information indicates a resource position of the second information block on the PDSCH.

In short, the first indication information sent by the network device to the terminal device, is carried in the at least one information block of the plurality of first information blocks sent by the network device to the terminal device. The first indication information is used for indicating the resource position of the second information block on the PDSCH through the first scheduling information.

Therefore, after receiving the first indication information, the terminal device may receive the first scheduling information according to the first indication information, and then receive the second information block based on the first scheduling information. In other words, the network device can realize flexible scheduling of the MIB and SIB1 of the network device through different modes for carrying the first indication information.

It should be noted that the terms "first information block", "second information block", "third information block" and the like are used in embodiments of the present disclosure, but these information blocks should not be limited to these terms. These terms are only used to distinguish information blocks from each other. Similar terms also include scheduling information, indication information, and so on.

For example, in implementations of the present disclosure, minimum system information (Minimum SI) may be divided into two parts, one part is transmitted in a Physical Broadcast Channel (PBCH), and contents of the information belongs to NR-"Master Information Block (MIB)". The other part is transmitted in a Physical Downlink Shared Channel (PDSCH), which belongs to NR-"System Information Block (SIB)", and also can be called as Remaining System Information (RMSI). Specifically, the RMSI may include an SIB1 and/or SIB2.

As an example but not limitation, the first information block may refer to an MIB, the second information block may refer to an SIB1, and the third information block may refer to an SIB2.

It can be seen that a unified and fixed scheduling mode is used for the system information in the LTE. That is, the terminal monitors the MIB and SIB1 on specific time-frequency resources, and then acquires scheduling information of another SIB from the SIB1. In the implementation of the present disclosure, the network device sends system information by using a flexible scheduling mode. In other words, the MIB and SIB1 in the LTE are coupled together by using a unified scheduling mode, while in the implementation of the present disclosure, the scheduling mode of the MIB and SIB1 is decoupled, that is, the MIB and SIB1 are flexibly scheduled.

The following is an exemplary description of a specific carrying mode of the first indication information in the implementation of the present disclosure.

In an implementation, a network device sends a plurality of first information blocks to the terminal device during a period of a second information block, and at least one first information block of the plurality of first information blocks is only used for carrying indication information used for indicating scheduling information of the second information block.

Optionally, each first information block of the plurality of first information blocks is only used for carrying first indication information used for indicating first scheduling information of the second information block.

Specifically, the network device may send the plurality of first information blocks to the terminal device on the PBCH during the first period, and each first information block of the plurality of first information blocks includes the same first indication information. The first period is a period during which the network device sends the second information block to the terminal device on the PDSCH.

In addition, an implementation of the present disclosure introduces a concept of a resource control set (CORESET), and the PDCCH is transmitted in the CORESET. The CORESET may occupy 1 to 3 time domain symbols in time domain, and occupy a configurable bandwidth instead of an entire system bandwidth in frequency domain. In other words, the frequency resource bandwidth occupied by the CORSET and the number of time domain symbols may be configured by the network device for the terminal device through a high-layer signaling. In other words, a search space of each terminal device may be defined based on a resource control set (CORESET).

That is, the first indication information in the implementation of the present disclosure may be a CORESET value.

It can be understood that in an implementation of the present disclosure, the network device may set different CORESET values for the PBCH during different first periods, and set a same CORESET value for the PBCH during a single first period, so that each first information block of the plurality of first information blocks during each first period, includes the same first indication information.

Figure 3:
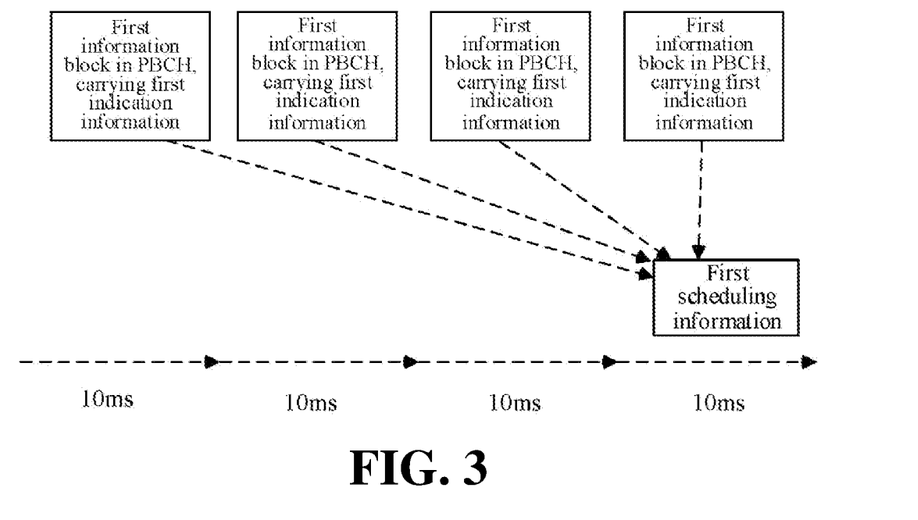
FIG. 3 is a schematic diagram of a plurality of first information blocks and first scheduling information according to an implementation of the present disclosure.

For example, as shown in FIG. 3, assuming that a period of an NR-MIB is 10 ms, a period of an NR-SIB1 is 40 ms, scheduling resources of RMSI in a PDSCH, which are indicated in every 4 NR-MIBs in a PBCH, may be set to a same value.

Therefore, the existing PBCH and PDCCH formats can be unchanged, and the application range of the data transmission method of the implementation of the invention can be further improved.

Optionally, only one first information block of the plurality of first information blocks is used for carrying the first indication information used for indicating the first scheduling information of the second information block.

Specifically, before the network device sends the first indication information to the terminal device, the network device may determine a first system frame number during the first period. The network device sends the plurality of first information blocks to the terminal device on the PBCH during the first period, and a first information block, of the plurality of first information blocks, corresponding to the first system frame number includes the first indication information.

More particularly, the network device may set different CORESET values for PBCHs during different first periods, and different CORESET values may be set for a PBCH during one single first period, so that only one first information block of the plurality of first information blocks includes the first indication information during one single first period.

For example, the first period is a multiple of a second period, and the second period is a period during which the network device sends the plurality of first information blocks to the terminal device on the PBCH. For example, the network device may determine the first system frame number according to following criteria: a remainder of the first system frame number divided by a first value is equal to a first threshold, the first value is a quotient of the first period divided by the second period, and the first threshold is used for the network device to determine the first system frame number in the first period.

Figure 4:
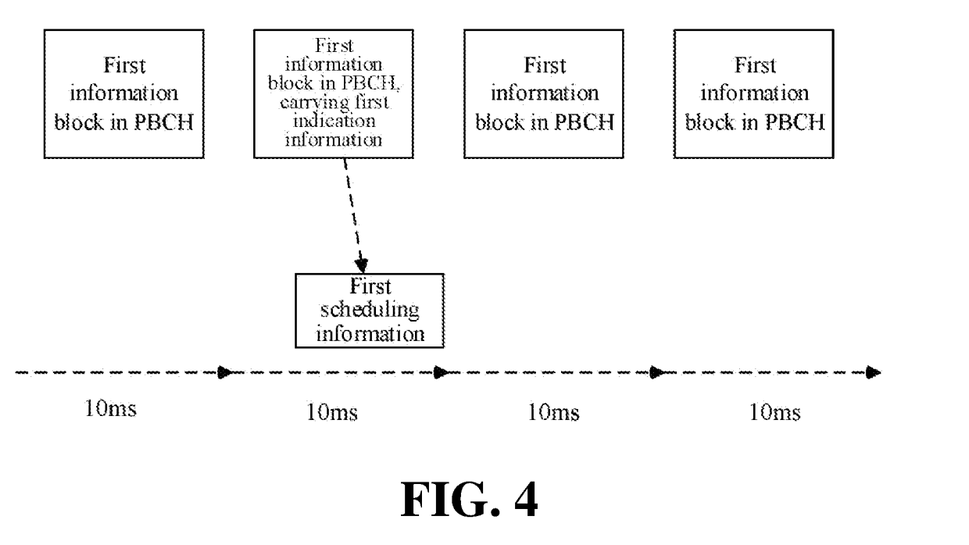
FIG. 4 is another schematic diagram of a plurality of first information blocks and first scheduling information according to an implementation of the present disclosure.

For example, as shown in FIG. 4, assuming that a period of an NR-MIB is 10 ms, a period of an NR-SIB1 is 40 ms, that is, during 40 ms, only one NR-MIB in every 4 NR-MIBs carries first indication information used for indicating a transmission resource of an SIB1.

Further, how to carry it may be determined based on a first threshold in the implementation of the present disclosure. For example, system frame number (SFN) mod 4=0, or 1, or 2, or 3. In this way, the terminal device only needs to read the CORESET on the PDCCH according to the first threshold after receiving the NR-MIB, and then acquires an SIB1 on the PDSCH.

It should be understood that in the implementations of the present disclosure, FIG. 3 and FIG. 4 only illustrate the implementations of the network device flexibly indicating the NR-MIB and the SIB1 for the terminal device when the first information block is the NR-MIB and the second information block is the SIB1. Scheduling modes of other system information are not specifically limited in the implementation of the present disclosure.

For example, the second information block may further includes second scheduling information, the second scheduling information is used for indicating a resource position of a third information block on a PDSCH, and the second information block and the third information block are different information blocks. Further, the third information block may be an SIB2. Specifically, the network device may put the SIB2 into a scheduling info list included in an SIB1.

In another implementation, a network device may send a plurality of first information blocks to a terminal device during a period of a second information block. The plurality of first information blocks may carry first indication information used for indicating first scheduling information of the second information block, and the second indication information used for indicating second scheduling information of a third information block.

However, since the CORESET of the PDCCH can only indicate one type of an SIB, i.e. an SIB1 or an SIB2, the assumption here is that RMSI includes an SIB1 and an SIB2.

Optionally, different first information blocks of the plurality of first information blocks carry the first indication information and the second indication information.

Specifically, before the network device sends the first indication information to the terminal device, the network device may determine a first system frame number and a second system frame number during the first period. The first system frame number and the second system frame number are different system frame numbers. The network device sends second indication information to the terminal device according to the first system frame number and the second system frame number. The first indication information is carried in a first information block, of the plurality of first information blocks, corresponding to the first system frame number. The second indication information is carried in a first information block, of the plurality of first information blocks, corresponding to the second system frame number. The second indication information is used for indicating a resource position of second scheduling information on the PDCCH. The second scheduling information is used for indicating a resource position of a third information block on a PDSCH. The third information block and the second information block are different information blocks.

For example, the first period may be a multiple of a second period, and the second period is a period during which the network device sends the plurality of first information blocks to the terminal device on the PBCH. Specifically, the terminal device may determine the first system frame number and the second system frame number according to following criteria: a remainder of the first system frame number divided by a second value is equal to a second threshold, the second threshold is used for the network device to determine the first system frame number during the first period; a remainder of the second system frame number divided by the second value is equal to a third threshold, the third threshold is used for the network device to determine the second system frame number during the first period, and the second threshold and the third threshold are not equal.

Further, the first threshold is equal to 0, and the second threshold is equal to 1.

Figure 5:
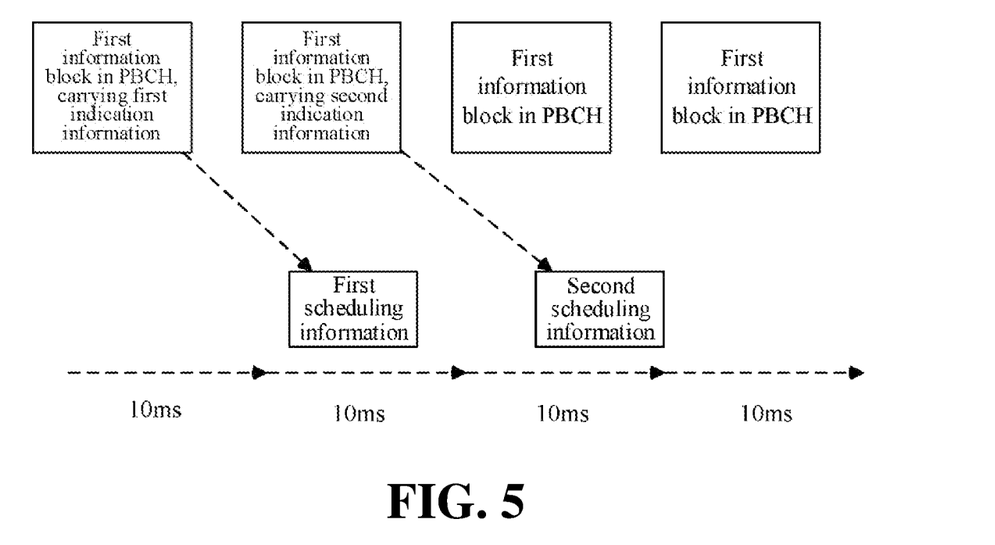
FIG. 5 is another schematic diagram of a plurality of first information blocks and scheduling information according to an implementation of the present disclosure.

For example, as shown in FIG. 5, assuming that a period of an NR-MIB is 10 ms, a period of an NR-SIB1 is 40 ms, that is, during 40 ms, only one NR-MIB in every 4 NR-MIBs carries first indication information used for indicating a transmission resource of an SIB1, and only one NR-MIB in every 4 NR-MIBs carries second indication information used for indicating a transmission resource of an SIB2. The NR-MIB carrying the first indication information and the NR-MIB carrying the second indication information are different NR-MIBs.

Further, how to carry it may be determined based on the second threshold and the third threshold in the implementation of the present disclosure. For example, when SFN mod 2=0, a PDCCH CORESET indicates an SIB1, when SFN mod 2=1, the PDCCH CORESET indicates an SIB2.

It should be noted that the various numerical values, the SIB1 and the SIB2 of the implementation of the present disclosure are merely exemplary descriptions, and the implementation of the present disclosure is not limited thereto. The core idea of the implementation of the invention is to enable the terminal device to acquire different remaining system information at different NB-MIB periods.

It should also be understood that the first threshold, the second threshold and the third threshold in the implementation of the present disclosure may be configured by the network device or may be determined through negotiation with the network device, and the implementation of the present disclosure is not specifically to limit this.

Figure 6:
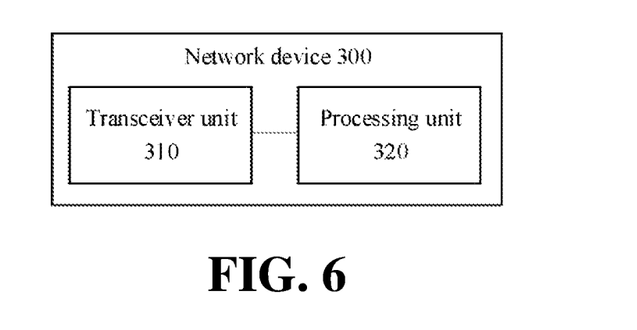
FIG. 6 is a schematic block diagram of a network device according to an implementation of the present disclosure.

FIG. 6 is a schematic diagram of a network device 300 according to an implementation of the present disclosure.

As shown in FIG. 6, the network device 300 includes a transceiver unit 310.

The transceiver unit 310 is used for: sending first indication information to a terminal device, the first indication information is carried in at least one first information block, and a plurality of first information blocks sent by the network device sends to the terminal device on a physical broadcast channel (PBCH) during a first period, include the above at least one first information block. The first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH; sending the first scheduling information to the terminal device on the PDCCH according to the first indication information during the first period; and sending the second information block to the terminal device on the PDSCH according to the first scheduling information during the first period.

Optionally, the transceiver unit 310 is specifically used for: sending the plurality of first information blocks to the terminal device on the PBCH during the first period, and each first information block of the plurality of first information blocks includes the same first indication information.

Optionally, the network device further includes: a processing unit 320, used for determining a first system frame number during the first period before the transceiver unit 310 sends the first indication information to the terminal device.

The transceiver unit 310 is specifically used for: sending the plurality of first information blocks to the terminal device on the PBCH during the first period, and a first information block, of the plurality of first information blocks, corresponding to the first system frame number includes the first indication information.

Optionally, the first period is a multiple of a second period, and the second period is a period during which the network device sends the plurality of first information blocks to the terminal device on the PBCH.

The processing unit 320 is specifically used for determining the first system frame number according to following criteria: a remainder of the first system frame number divided by a first value is equal to a first threshold, the first value is a quotient of the first period divided by the second period, and the first threshold is used for the network device to determine the first system frame number within the first period.

Optionally, the second information block includes second scheduling information, the second scheduling information is used for indicating a resource position of a third information block on the PDSCH, and the second information block and the third information block are different information blocks.

Optionally, the network device further includes: a processing unit 320, used for determining a first system frame number and a second system frame number during the first period before the transceiver unit 310 sends the first indication information to the terminal device. The first system frame number and the second system frame number are different system frame numbers.

The transceiver unit 310 is further used for: sending second indication information to the terminal device according to the first system frame number and the second system frame number, the first indication information is carried in a first information block, of the plurality of first information blocks, corresponding to the first system frame number, the second indication information is carried in a first information block, of the plurality of first information blocks, corresponding to the second system frame number, the second indication information is used for indicating a resource position of the second scheduling information on a PDCCH, the second scheduling information is used for indicating a resource position of a third information block on a PDSCH, and the third information block and the second information block are different information blocks.

Optionally, the first period is a multiple of a second period, and the second period is a period during which the network device sends the plurality of first information blocks to the terminal device on the PBCH.

The processing unit 320 is specifically used for determining the first system frame number and the second system frame number according to following criteria: a remainder of the first system frame number divided by a second value is equal to a second threshold, the second threshold is used for the network device to determine the first system frame number during the first period; a remainder of the second system frame number divided by the second value is equal to a third threshold, the third threshold is used for the network device to determine the second system frame number during the first period, and the second threshold and the third threshold are not equal.

Optionally, the first threshold is equal to 0, and the second threshold is equal to 1.

Figure 7:
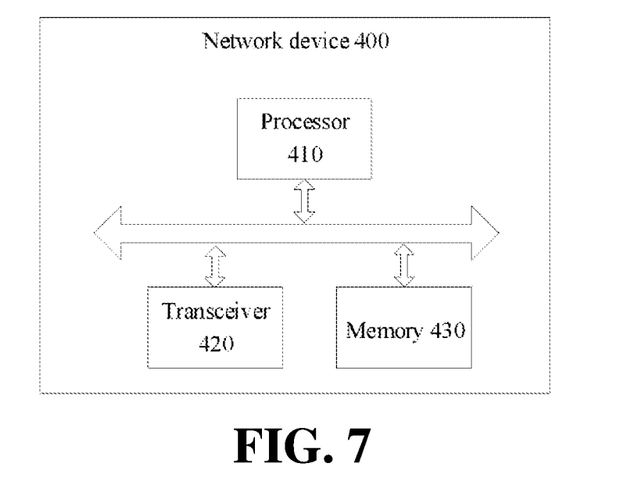
FIG. 7 is a schematic diagram of another network device according to an implementation of the present disclosure.

In an implementation of the present disclosure, the transceiver unit 310 may be implemented by a transceiver, and the processing unit 320 may be implemented by a processor. As shown in FIG. 7, a network device 400 may include a processor 410, a transceiver 420, and a memory 430. The memory 430 may be used for storing indication information, and may also be used for storing codes and instructions executed by the processor 410. The various components in the network device 400 are connected by a bus system. The bus system includes a power bus, a control bus and a status signal bus in addition to a data bus.

The network device 400 shown in FIG. 7 can implement the various processes implemented by the network device in the method example of FIG. 2 described above. In order to avoid duplication, the details will not be repeated here. That is, the method example in the implementation of the present disclosure may be implemented by a processor and a transceiver.

Figure 8:
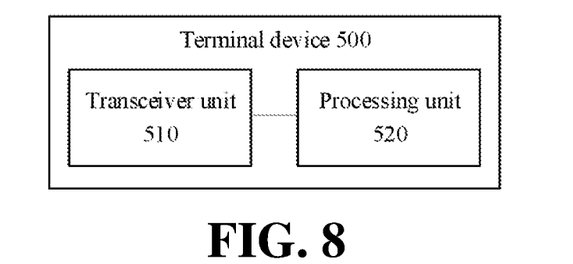
FIG. 8 is a schematic block diagram of a terminal device according to an implementation of the present disclosure.

FIG. 8 is a schematic block diagram of a terminal device 500 according to an implementation of the present disclosure.

As shown in FIG. 8, the terminal device 500 includes a transceiver unit 510.

The transceiver unit 510 is used for: receiving first indication information sent by a network device, and the first indication information is carried in at least one first information block, a plurality of first information blocks sent by the network device sends to the terminal device on a physical broadcast channel (PBCH) during a first period, include the above at least one first information block. The first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH; receiving the first scheduling information sent by the network device on the PDCCH according to the first indication information during the first period; and receiving the second information block sent by the network device on the PDSCH according to the first scheduling information during the first period.

Optionally, the transceiver unit 510 is specifically used for receiving the plurality of first information blocks sent by the network device on the PBCH during the first period, and each first information block of the plurality of first information blocks includes the same first indication information.

Optionally, the terminal device further includes a processing unit 520, used for determining a first system frame number during the first period, before the transceiver unit 510 receives the first indication information sent by the network device.

The transceiver unit 510 is specifically used for receiving the plurality of first information blocks sent by the network device on the PBCH during the first period. A first information block, in the plurality first information blocks, corresponding to the first system frame number includes the first indication information.

Optionally, the first period is a multiple of a second period, and the second period is a period during which the network device sends the plurality of first information blocks to the terminal device on the PBCH.

The processing unit 520 is specifically used for determining the first system frame number according to following criteria:

a remainder of the first system frame number divided by a first value is equal to a first threshold, the first value is a quotient of the first period divided by the second period, and the first threshold is used for the terminal device to determine the first system frame number within the first period.

Optionally, the second information block includes second scheduling information, the second scheduling information is used for indicating a resource position of a third information block on a PDSCH, and the second information block and the third information block are different information blocks.

Optionally, the terminal device further includes a processing unit 520, used for determining a first system frame number and a second system frame number during the first period before the transceiver unit 510 receives the first indication information sent by the network device. The first system frame number and the second system frame number are different system frame numbers.

The 510 transceiver unit is further used for receiving second indication information sent by the network device according to the first system frame number and the second system frame number, the first indication information is carried in a first information block, of the plurality of first information blocks, corresponding to the first system frame numbers, the second indication information is carried in a first information block, of the plurality of first information blocks, corresponding to the second system frame number, the second indication information is used for indicating a resource position of the second scheduling information on the PDCCH, the second scheduling information is used for indicating a resource position of a third information block on a PDSCH, and the third information block and the second information block are different information blocks.

Optionally, the first period is a multiple of a second period, and the second period is a period during which the network device sends the plurality of first information blocks to the terminal device on the PBCH.

The processing unit 520 is specifically used for determining the first system frame number and the second system frame number according to following criteria:

a remainder of the first system frame number divided by a second value is equal to a second threshold, the second threshold is used for the terminal device to determine the first system frame number during the first period; a remainder of the second system frame number divided by a second value is equal to a third threshold, the third threshold is used for the terminal device to determine the second system frame number during the first period, and the second threshold and the third threshold are not equal.

Optionally, the first threshold is equal to 0, and the second threshold is equal to 1.

Figure 9:
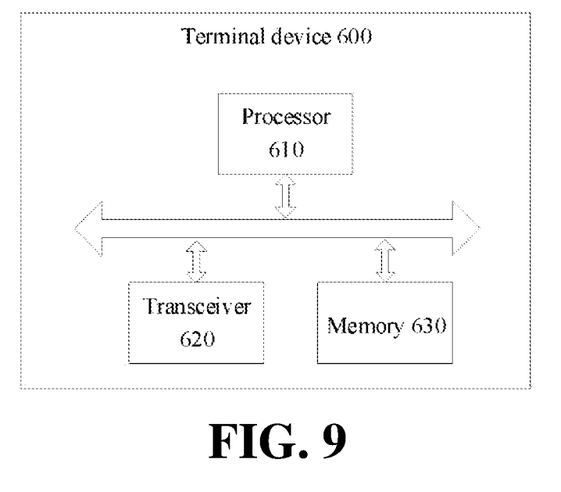
FIG. 9 is a schematic block diagram of another terminal device according to an implementation of the present disclosure.

In an implementation of the present disclosure, the transceiver unit 510 may be implemented by a transceiver, and the processing unit 520 may be implemented by a processor. As shown in FIG. 9, a terminal device 600 may include a processor 610, a transceiver 620, and a memory 630. The memory 630 may be used for storing indication information, and may also be used for storing codes and instructions executed by the processor 610. The various components in the terminal device 600 are connected by a bus system. The bus system includes a power bus, a control bus and a status signal bus in addition to a data bus.

The terminal device 600 shown in FIG. 9 can implement the various processes implemented by the terminal device in the method example of FIG. 2 described above. In order to avoid duplication, the details will not be repeated here. That is, the method example in the implementation of the present disclosure may be implemented by a transceiver and a processor.

In a process of implementation, each act of the method example in the implementations of the present disclosure may be completed by an integrated logic circuit of hardware in the processor or an instruction in a form of software. More particularly, the acts of the method disclosed in connection with the implementations of the present disclosure may be directly embodied in the execution of a hardware decoding processor or in the execution in the combination of hardware and software modules in the decoding processor. The software modules may be located in typical storage mediums in the art such as a random access memory, a flash memory, a read-only memory, a programmable read-only memory, an electrically erasable programmable memory, a register. The storage medium is located in the memory, and the processor reads the information in the memory and completes the acts of the above method in combination with its hardware.

It should be understood that the processor in implementations of the present disclosure may be an integrated circuit chip with a capability for processing signals. The processor can implement or execute the methods, acts or logical diagrams disclosed in the implementations of the present disclosure. For example, the processor may be a general purpose processor, a Digital Signal Processor (DSP), an Application Specific Integrated Circuit (ASIC), a Field Programmable Gate Array (FPGA) or other programmable logic device, a transistor logic device, or a discrete hardware assembly, or the like. In addition, the general purpose processor may be a microprocessor, or the processor may be any conventional processor or the like.

In addition, the memory mentioned in the implementations of the present disclosure may be a volatile memory or non-volatile memory, or may include both volatile and non-volatile memories. The non-volatile memory may be a Read-Only Memory (ROM), a Programmable Read Only Memory (Programmable ROM, PROM), an Erasable Programmable Read Only Memory (Erasable PROM, EPROM), an Electric Erase Programmable Read Only Memory (Electrically EPROM, EEPROM) or a flash memory. The volatile memory may be a Random Access Memory (RAM) that acts as an external high-speed cache. It should be understood that, the foregoing memory is an example for illustration and should not be construed as limiting. For example, optionally, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Finally, it should be noted that the terms used in implementations of the present disclosure and the attached claims are only intended to describe the specific implementations, but not intended to limit implementations of the present disclosure.

For example, as used in implementations of the present disclosure and the appended claims, the singular forms "a", "said", "the forgoing" and "the" include plural referents unless the context clearly dictates otherwise.

For example, the term depends on context, the term "when" as used herein may be construed to mean "if" or "on the assumption that" or "upon" or "in response to determining" or "in response to detecting" depending on the context. Similarly, the phrase "if it is determined that" or "if it is detected that (a stated condition or event)" may be construed to mean "when determining" or "in response to determining" or "upon detecting (a stated condition or event)" or "in response to detecting (a stated condition or event)".

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. One skilled in the art may use different methods to implement the described functions for each particular application, but it should not be considered that the implementation goes beyond the scope of the implementations of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The units described as separate units may or may not be physically separated, and the components shown as a unit may or may not be a physical unit, i.e., it may be located in one place or may be distributed over multiple network units. Some or all of the elements can be selected according to actual needs to achieve the purpose of the implementation of the present disclosure.

In addition, each of the function units in implementations of the present disclosure may be integrated into a processing unit, or exists independently, or two or more units are integrated into one unit.

When the functions are implemented in the form of a software functional unit and sold or used as an independent product, the functions may be stored in a computer-readable storage medium. Based upon such understanding, the technical solutions of implementations of the present disclosure in essence or the part thereof contributing to the prior art or the part of the technical solutions can be embodied in the form of a software product. The computer software product is stored in a storage medium and includes several instructions to cause a computer device (e.g., a personal computer, a server, a network device, etc.) to perform all or a part of the acts in the methods according to implementations of the present disclosure. The above storage medium may include a U-disk, a mobile hard disk, a Read-Only Memory (ROM), a Random Access Memory (RAM), a magnetic disk, an optical disk or various other medium in which program codes can be stored.

The foregoing descriptions are merely specific implementations of the implementations of the present disclosure, but are not intended to limit the protection scope of the implementations of the present disclosure. Any variation or replacement readily figured out by a person skilled in the art within the technical scope disclosed in the implementations of the present disclosure shall fall within the protection scope of the implementations of the present disclosure. Therefore, the protection scope of the implementations of the present disclosure shall be subject to the protection scope of the claims.

What I claimed is:

1. A data transmission method, comprising:

sending, by a network device, first indication information to a terminal device, wherein the first indication information is carried in at least one first information block, a plurality of first information blocks sent by the network device to the terminal device on a physical broadcast channel (PBCH) during a first period comprise the at least one first information block, the first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH;

sending, by the network device, the first scheduling information to the terminal device on the PDCCH according to the first indication information during the first period; and sending, by the network device, the second information block to the terminal device on the PDSCH according to the first scheduling information during the first period;

wherein before the network device sends the first indication information to the terminal device, the method further comprises:

determining, by the network device, a first system frame number and a second system frame number during the first period, wherein the first system frame number and the second system frame number are different system frame numbers; and sending, by the network device, second indication information to the terminal device according to the first system frame number and the second system frame number, wherein the first indication information is carried in a first information block, of the plurality of first information blocks, corresponding to the first system frame number, the second indication information is carried in a first information block, of the plurality of first information blocks, corresponding to the second system frame number, the second indication information is used for indicating a resource position of the second scheduling information on the PDCCH, the second scheduling information is used for indicating a resource position of a third information block on a PDSCH, and the third information block and the second information block are different information blocks, wherein the first period is a multiple of a second period, the second period is a period during which the network device sends the plurality of first information blocks to the terminal device on the PBCH;

wherein determining, by the network device, the first system frame number and the second system frame number during the first period, comprises:

determining the first system frame number and the second system frame number according to following criteria:

a remainder of the first system frame number divided by a second value is equal to a second threshold, the second threshold is used for the network device to determine the first system frame number during the first period; a remainder of the second system frame number divided by the second value is equal to a third threshold, the third threshold is used for the network device to determine the second system frame number during the first period, and the second threshold and the third threshold are not equal.

2. The method of claim 1, wherein sending, by the network device, the first indication information to the terminal device comprises:

sending, by the network device, the plurality of first information blocks to the terminal device on the PBCH during the first period, wherein each first information block of the plurality of first information blocks comprises the same first indication information.

3. A data transmission method, comprising:

receiving, by a terminal device, first indication information sent by a network device, wherein the first indication information is carried in at least one first information block, a plurality of first information blocks sent by the network device to the terminal device on a physical broadcast channel (PBCH) during a first period comprise the at least one first information block, the first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH;

receiving, by the terminal device, the first scheduling information sent by the network device on the PDCCH according to the first indication information during the first period; and receiving, by the terminal device, the second information block sent by the network device on the PDSCH according to the first scheduling information during the first period;

wherein before the terminal device receives the first indication information sent by the network device, the method further comprises:

determining, by the terminal device, a first system frame number and a second system frame number during the first period, wherein the first system frame number and the second system frame number are different system frame numbers;

wherein receiving, by the terminal device, the first indication information sent by the network device comprises:

receiving, by the terminal device, second indication information sent by the network device according to the first system frame number and the second system frame number, wherein the first indication information is carried in a first information block, of the plurality first information blocks, corresponding to the first system frame number, the second indication information is carried in a first information block, of the plurality of first information blocks, corresponding to the second system frame number, the second indication information is used for indicating a resource position of the second scheduling information on the PDCCH, the second scheduling information is used for indicating a resource position of a third information block on a PDSCH, and the third information block and the second information block are different information blocks, wherein the first period is a multiple of a second period, the second period is a period during which the network device sends the plurality of first information blocks to the terminal device on the PBCH;

wherein determining, by the terminal device, the first system frame number and the second system frame number during the first period, comprises:

determining the first system frame number and the second system frame number according to following criteria:

a remainder of the first system frame number divided by a second value is equal to a second threshold, the second threshold is used for the terminal device to determine the first system frame number during the first period; a remainder of the second system frame number divided by the second value is equal to a third threshold, the third threshold is used for the terminal device to determine the second system frame number during the first period, and the second threshold and the third threshold are not equal.

4. The method of claim 3, wherein receiving, by the terminal device, the first indication information sent by the network device comprises:

receiving, by the terminal device, the plurality of first information blocks sent by the network device on the PBCH during the first period, wherein each first information block of the plurality of first information blocks comprises the same first indication information.

5. The method according to claim 3, wherein the second information block comprises second scheduling information, the second scheduling information is used for indicating a resource position of a third information block on a PDSCH, and the second information block and the third information block are different information blocks.

6. A terminal device, comprising: a transceiver;
wherein the transceiver is used for: receiving first indication information sent by a network device, wherein the first indication information is carried in at least one first information block, a plurality of first information blocks sent by the network device to the terminal device on a physical broadcast channel (PBCH) during a first period comprise the at least one first information block, the first indication information is used for indicating a resource position of first scheduling information on a physical downlink control channel (PDCCH), the first scheduling information is used for indicating a resource position of a second information block on a physical downlink shared channel (PDSCH), and the first period is a period during which the network device sends the second information block to the terminal device on the PDSCH;

receiving the first scheduling information sent by the network device on the PDCCH according to the first indication information during the first period; and receiving the second information block sent by the network device on the PDSCH according to the first scheduling information during the first period;

wherein the terminal device further comprises:

a processor used for, before the transceiver receives the first indication information sent by the network device, determining a first system frame number and a second system frame number during the first period, wherein the first system frame number and the second system frame number are different system frame numbers;

wherein the transceiver is further used for:

receiving second indication information sent by the network device according to the first system frame number and the second system frame number, wherein the first indication information is carried in a first information block, of the plurality of first information blocks, corresponding to the first system frame number, the second indication information is carried in a first information block, of the plurality of first information blocks, corresponding to the second system frame number, the second indication information is used for indicating a resource position of the second scheduling information on the PDCCH, the second scheduling information is used for indicating a resource position of a third information block on a PDSCH, and the third information block and the second information block are different information blocks, wherein the first period is a multiple of a second period, the second period is a period during which the network device sends the first information blocks to the terminal device on the PBCH:

wherein the processor is specifically used for:

determining the first system frame number and the second system frame number according to following criteria:

a remainder of the first system frame number divided by a second value is equal to a second threshold, the second threshold is used for the terminal device to determine the first system frame number during the first period; a remainder of the second system frame number divided by the second value is equal to a third threshold, the third threshold is used for the terminal device to determine the second system frame number during the first period, and the second threshold and the third threshold are not equal.

7. The terminal device according to claim 6, wherein the transceiver is specifically used for:

receiving the plurality first information blocks sent by the network device on the PBCH during the first period, wherein each first information block of the plurality of first information blocks comprises the same first indication information.

8. The terminal device claim 6, wherein the second information block comprises second scheduling information, the second scheduling information is used for indicating a resource position of a third information block on a PDSCH, and the second information block and the third information block are different information blocks.

* * * * *